(12) United States Patent
Liang et al.

(10) Patent No.: US 12,158,671 B2
(45) Date of Patent: Dec. 3, 2024

(54) DISPLAY PANELS AND DISPLAY DEVICES

(71) Applicant: TCL CHINA STAR OPTOELECTRONICS TECHNOLOGY CO., LTD., Guangdong (CN)

(72) Inventors: Qunfang Liang, Guangdong (CN); Yani Chen, Guangdong (CN); Kang Lu, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/352,288

(22) Filed: Jul. 14, 2023

(65) Prior Publication Data

US 2024/0255813 A1 Aug. 1, 2024

(30) Foreign Application Priority Data

Jan. 30, 2023 (CN) .......................... 202310092658.9

(51) Int. Cl.
*G02F 1/1343* (2006.01)
*G02F 1/1333* (2006.01)
*G02F 1/1335* (2006.01)
*G02F 1/13357* (2006.01)
*G02F 1/1337* (2006.01)
*G02F 1/1362* (2006.01)

(52) U.S. Cl.
CPC .. *G02F 1/134336* (2013.01); *G02F 1/133331* (2021.01); *G02F 1/133602* (2013.01); *G02F 1/133707* (2013.01); *G02F 1/136209* (2013.01); *G02F 1/133512* (2013.01)

(58) Field of Classification Search
CPC ......... G02F 1/133331; G02F 1/133602; G02F 1/133707; G02F 1/135209; G02F 1/133512
See application file for complete search history.

(56) References Cited

U.S. PATENT DOCUMENTS

| 2011/0242467 | A1* | 10/2011 | Kim | .................... | H10K 50/8426 |
| | | | | | 349/113 |
| 2015/0187800 | A1* | 7/2015 | Park | .................... | H01L 27/1225 |
| | | | | | 257/43 |
| 2018/0046038 | A1* | 2/2018 | Lazo | .................. | G02F 1/134336 |
| 2019/0041705 | A1* | 2/2019 | Hao | .................. | G02F 1/136286 |

\* cited by examiner

*Primary Examiner* — Jessica M Merlin
(74) *Attorney, Agent, or Firm* — PV IP PC; Wei Te Chung

(57) ABSTRACT

A display panel and a display device are provided. The display panel includes a first substrate and the second substrate disposed oppositely, a plurality of liquid crystal molecules disposed between the first substrate and the second substrate, a plurality of pixel electrodes, a plurality of light-shielding electrodes and a plurality of auxiliary electrodes disposed on a same layer as the pixel electrodes. A first gap is defined between adjacent ones of the pixel electrodes, each light-shielding electrode is correspondingly disposed in a spacing. Each auxiliary electrode is located between an adjacent pixel electrode and a light-shielding electrode, a voltage applied to each auxiliary electrode is equal to a voltage applied to corresponding pixel electrode. An electric field is formed between the auxiliary electrode and the corresponding light-shielding electrode.

18 Claims, 11 Drawing Sheets

DISPLAY PANELS AND DISPLAY DEVICES

CROSS-REFERENCE TO RELATED APPLICATION

This application claims priority to and the benefit of Chinese Patent Application No. 202310092658.9, filed on Jan. 31, 2023, the disclosure of which is incorporated herein by reference in its entirety.

TECHNICAL FIELD

The present disclosure relates to display technologies, and in particular to display panels and display devices.

BACKGROUND

Multi domain pixels may improve the problem of chromaticity deviation at large viewing angles, and are widely used in liquid crystal display panel design. But transmittance of some small and medium-sized liquid crystal display devices with low resolution and provided with 8-domain or 4-domain pixels is low, so achieving the desired corresponding transmittance would greatly increase power consumption and production costs. As shown in FIG. 1, a central trunk of the 2-domain pixels has been removed, the open area is increased, the transmittance is greatly improved, and power consumption is reduced. However, and there are very serious dark lines close to an edge trunk in the existing 2-domain pixel design, which makes its transmittance improvement away from expected.

SUMMARY

In view of the above, the embodiments of the present disclosure provides a display panel and a display device including the display panel, the display panel includes a first substrate and a second substrate disposed oppositely, and a plurality of liquid crystal molecules disposed between the first substrate and the second substrate. The display panel further includes:
 a plurality of pixel electrodes disposed on a side of the first substrate facing the second substrate in an array, wherein a first gap is defined between adjacent ones of the pixel electrodes;
 a plurality of light-shielding electrodes disposed on a same layer as the pixel electrodes, each of the light-shielding electrodes correspondingly disposed in the first gap; and
 a plurality of auxiliary electrodes disposed on the same layer as the pixel electrodes, each of the auxiliary electrodes being located between adjacent one of the pixel electrodes and one of the light-shielding electrodes, a voltage applied to each of the auxiliary electrodes being equal to a voltage applied to corresponding one of the pixel electrodes.

An electric field is formed between each of the auxiliary electrodes and corresponding one of the light-shielding electrodes.

BRIEF DESCRIPTION OF THE DRAWINGS

To describe the technical solutions of the embodiments of the present disclosure or the prior art more clearly, the following briefly introduces the accompanying drawings used in the description of the embodiments of the present disclosure. Apparently, the accompanying drawings described below illustrate only some exemplary embodiments of the present disclosure, and persons skilled in the art may derive other drawings from the drawings without making creative efforts.

DETAILED DESCRIPTION

The following description of every embodiment with reference to the accompanying drawings is used to exemplify a specific embodiment which may be carried out in the present disclosure. Directional terms mentioned in the present disclosure, such as "top", "bottom", "front", "back", "left", "right", "inside", "outside", "side" etc., are only used with reference to orientations of the accompanying drawings. Therefore, the used directional terms are intended to illustrate and understand, but not to limit, the present disclosure. In the accompanying drawings, units with similar structures are indicated by a same number. In the accompanying drawings, thicknesses of some layers and areas have been exaggerated for clarity and ease of description. Sizes and thicknesses of each component shown in the accompanying drawings are arbitrary, but the present disclosure is not limited to thereto.

Figure 1:
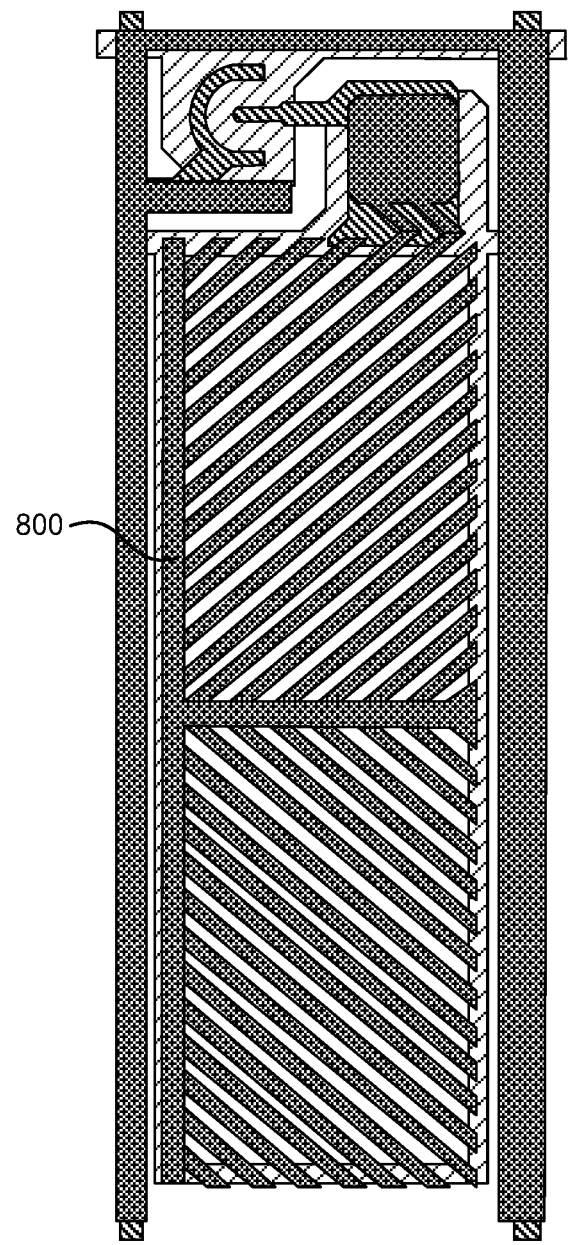
FIG. 1 is a top schematic view of an existing pixel electrode.
Figure 2:
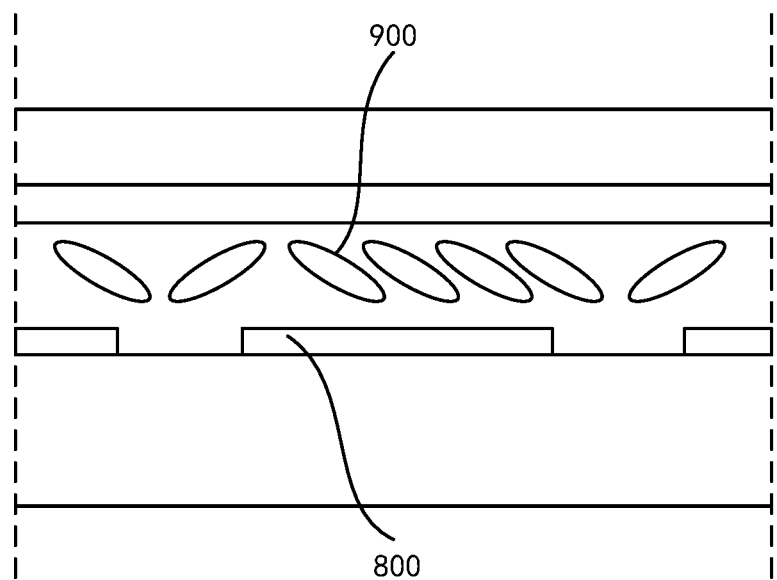
FIG. 2 is a principle schematic view of dark lines generated on the edges of the existing pixel electrode.

For a problem of serious dark lines close to an edge trunk of the existing pixel structure, the inventor of this application has found in his research that, referring to FIGS. 1 and 2, liquid crystal molecules 900 on the edge trunk 800 of the pixel structure fall down disorderly, resulting in the dark lines close to the edge trunk 800.

Therefore, the present disclosure provides a display panel and a display device to solve the above problems.

Figure 3:
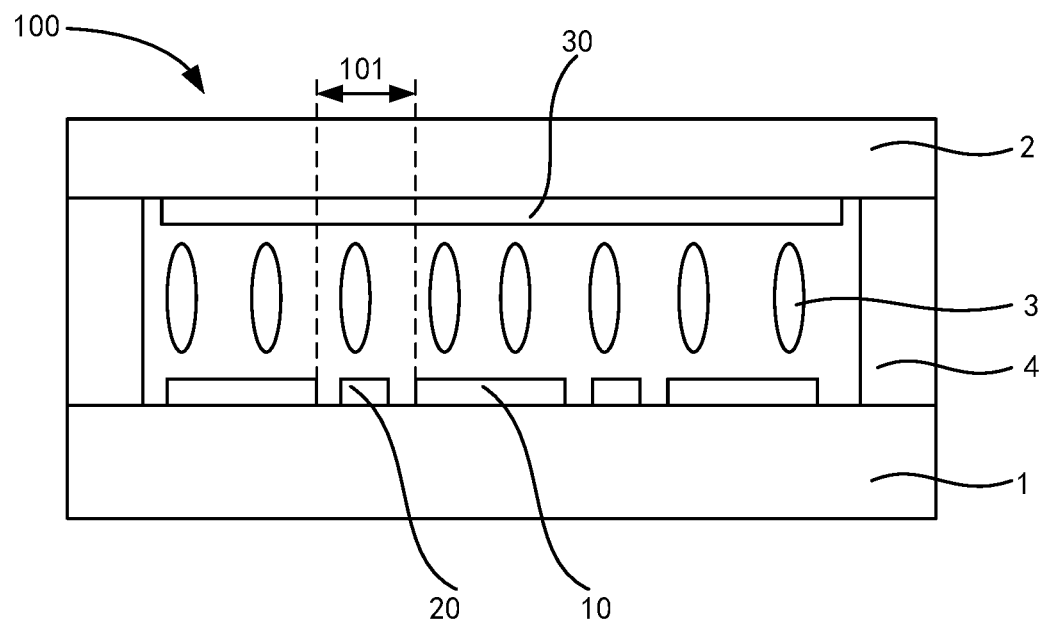
FIG. 3 is a cross-sectional schematic view of a display panel provided by an embodiment of the present disclosure.
Figure 4:
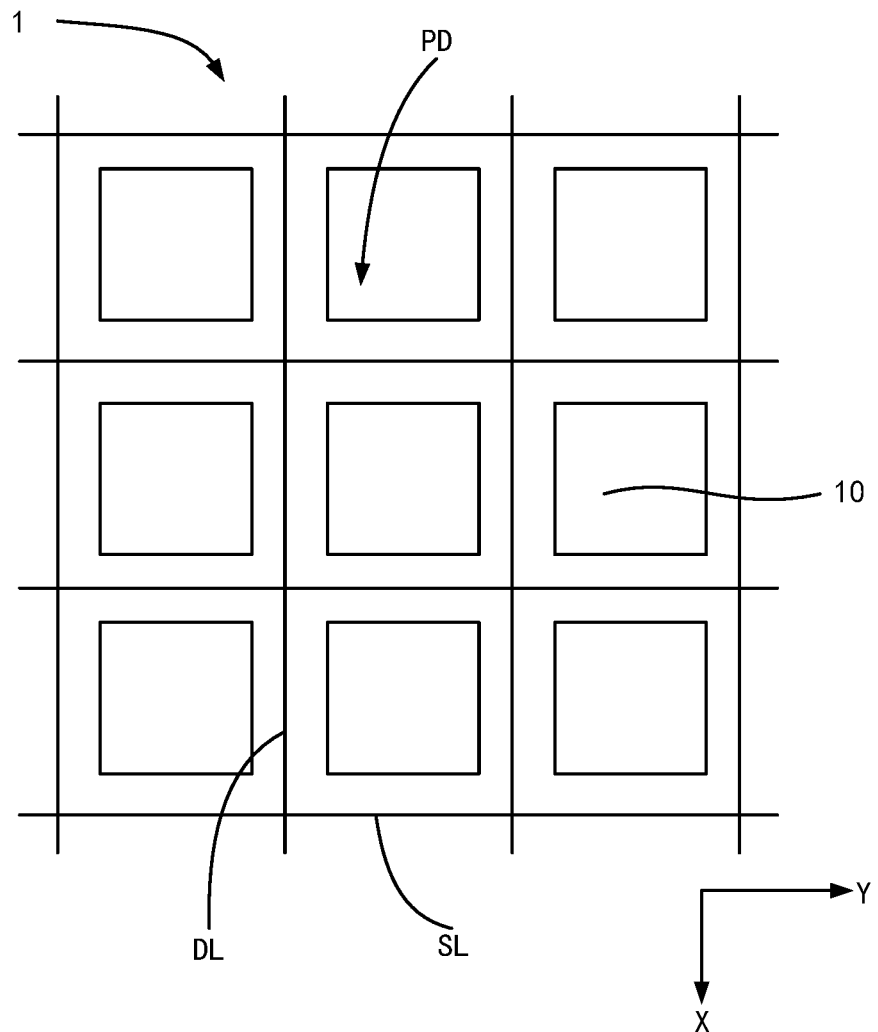
FIG. 4 is a top schematic view of a first substrate provided by an embodiment of the present disclosure.
Figure 5:
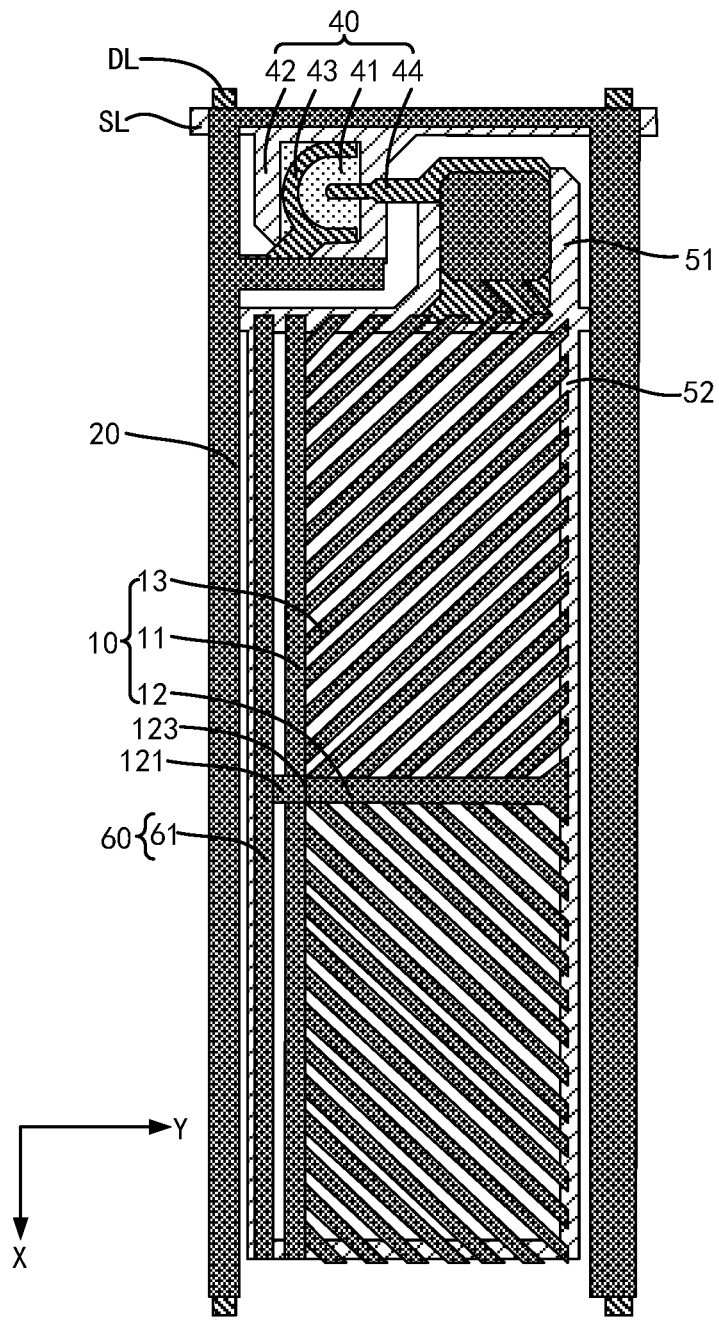
FIG. 5 is a first top schematic view of a pixel electrode provided by an embodiment of the present disclosure.
Figure 6:
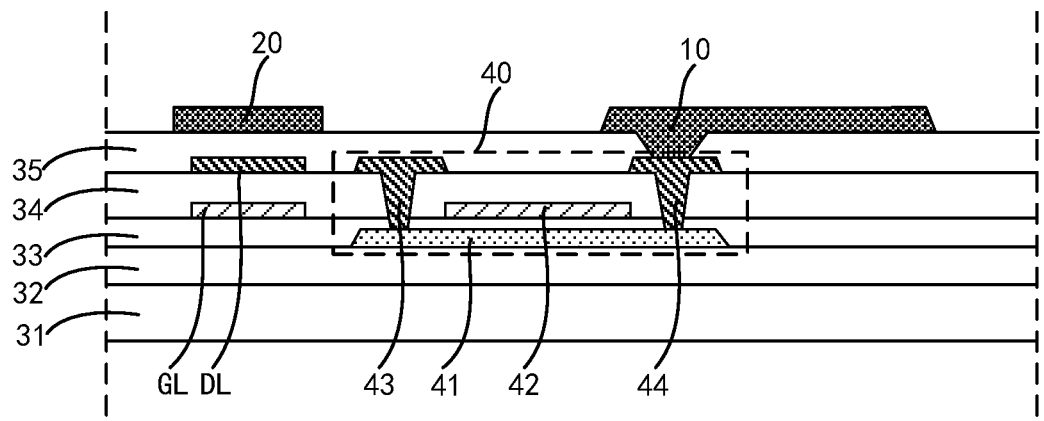
FIG. 6 is a cross-sectional schematic view of the first substrate provided by an embodiment of the present disclosure.
Figure 7:
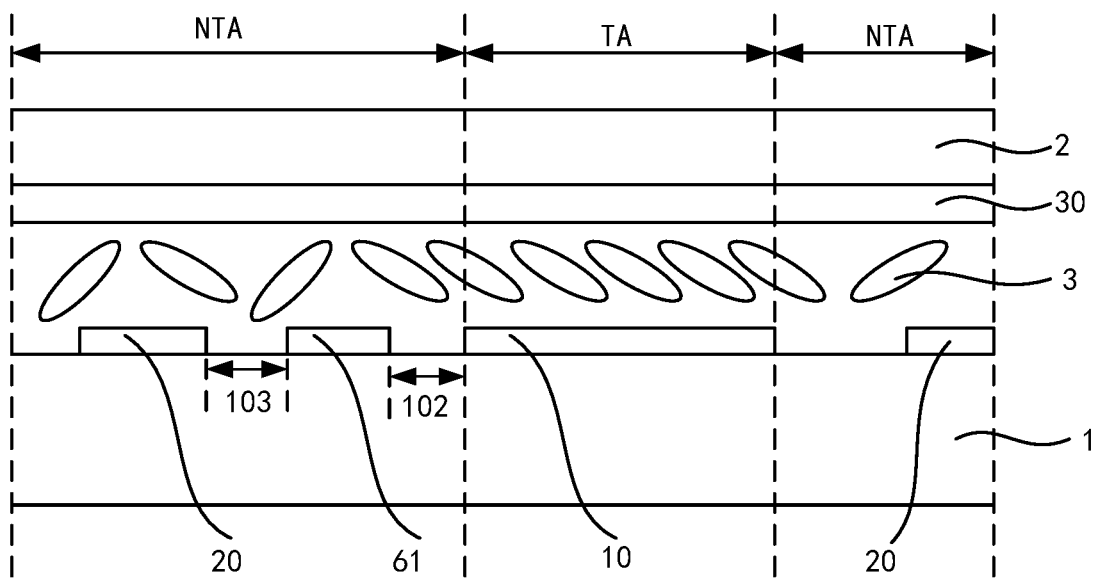
FIG. 7 is a schematic view of liquid crystal deflection at edges of the pixel electrode in FIG. 5.

Referring to FIGS. 3 to 7 in combination, FIG. 3 is a cross-sectional schematic view of a display panel provided by an embodiment of the present disclosure, FIG. 4 is a top schematic view of a first substrate provided by an embodiment of the present disclosure, FIG. 5 is a first top schematic view of a pixel electrode provided by an embodiment of the present disclosure, FIG. 6 is a cross-sectional schematic view of the first substrate provided by an embodiment of the present disclosure, and FIG. 7 is a schematic view of liquid crystal deflection at edges of the pixel electrode in FIG. 5. The display panel 100 includes the first substrate 1, a second substrate 2 disposed opposite to the first substrate 1, and a plurality of liquid crystal molecules 3 disposed between the first substrate 1 and the second substrate 2.

The first substrate 1 is an array substrate, and the second substrate 2 is a color filter substrate, but the present disclosure is not limited thereto, one of the first substrate 1 and the second substrate 2 of the present disclosure is a color-filter-on array (COA) substrate, that is, a color filter is integrated on an array substrate. Apparently, the display panel 100 further includes a sealant 4 disposed between the first substrate 1 and the second substrate 2 and surrounding a plurality of liquid crystal molecules 3, the sealant 4 is used for bonding the first substrate 1 and the second substrate 2.

The specific structure of the display panel 100 is described below by taking the first substrate 1 as the array substrate and the second substrate 2 as the color filter substrate as an example.

Referring to FIG. 3, a plurality of pixel electrodes 10 and a plurality of light-shielding electrodes 20 are disposed on the first substrate 1, and the plurality of the pixel electrodes 10 are disposed on a side of the first substrate 1 facing the second substrate 2 in an array. A first gap 101 is defined between adjacent ones of the pixel electrodes 10. The plurality of the light-shielding electrodes 20 are disposed on a same layer as the pixel electrodes 10, and each light-shielding electrode 20 is correspondingly disposed in the first gap 101.

A first common electrode 30 is disposed on the second substrate 2, and the first common electrode 30 is disposed on a side of the second substrate 2 facing the first substrate 1. The combination of the pixel electrode 10 and the first common electrode 30 is used to control a deflection of the liquid crystal molecules 3.

It should be noted that the "disposed in a same layer" in this application means that in a preparation process, a film layer formed by a same material is patterned to obtain at least two different structures, and the at least two different structures are disposed in the same layer. For example, the pixel electrode 10 and the light-shielding electrode 20 in the embodiment are obtained by patterning a same transparent conductive film layer, then the pixel electrode 10 and the light-shielding electrode 20 are disposed in the same layer. Materials of the pixel electrodes 10 and the light-shielding electrodes 20 include transparent conductive materials such as indium tin oxide (ITO).

Specifically, referring to FIG. 4, a plurality of data lines DL extending along the first direction X and a plurality of gate scanning lines SL extending along the second direction Y are further disposed on the first substrate 1. Optionally, the first direction X is a vertical direction, the second direction Y is a horizontal direction, and an included angle between the first direction X and the second direction Y is 90 degrees. The plurality of the data lines DL are arranged in parallel and at intervals along the second direction Y, and the plurality of the gate scanning lines SL are arranged in parallel and at intervals along the first direction X. Apparently, the present disclosure is not limited thereto, and the included angle between the first direction X and the second direction Y in the present disclosure may also be other included angles, such as 45 degrees, 60 degrees, and so on.

The data line DL and the gate scanning line SL cross and define a plurality of pixel regions PD, and the plurality of the pixel electrodes 10 are respectively disposed in different pixel regions PD, and a pixel region PD corresponds to one sub-pixel. The structure of the pixel electrode 10 of the present disclosure is described in detail below by taking the pixel electrode 10 in a pixel region PD as an example.

Referring to FIG. 5, the pixel electrode 10 is located in the pixel region PD defined by the data line DL and the gate scanning line SL, and each pixel region PD is further provided with a thin film transistor 40 electrically connected to the pixel electrode 10. The thin film transistor 40 is configured to provide a driving voltage applied to the pixel electrode 10. The thin film transistor 40 includes an active layer 41, a gate 42, a source 43 and a drain 44, the gate 42 is disposed on a same layer as the gate scanning line SL, and the gate 42 is electrically connected to the gate scanning line SL. The source 43 and the drain 44 are disposed on a same layer as the data line DL, the source 43 is electrically connected to the data line DL, and the pixel electrode 10 is electrically connected to the drain 44.

The light-shielding electrode 20 corresponds to the data line DL and the gate scanning line SL, and a width of the light-shielding electrode 20 is greater than a width of the data line DL. The light-shielding electrode 20 is configured to shield the data line DL and the gate scanning line SL, so as to reduce light leakage between pixels. Substituting the existing black matrix (BM) with the light-shielding electrode 20 to shield the data line DL and the gate scanning line SL, that is, data BM less (DBS) technology, may realize flat screen and curved screen shared, and improve the transmittance of the display panel 100.

In addition, the display panel 100 further includes a second common electrode 51 and a light-shielding portion 52 electrically connected to the second common electrode 51. The light-shielding portion 52 is located between the data line DL and the pixel electrode 10 to cooperate with the light-shielding electrode 20 to form a combined light-shielding design.

The positional relationship and effect of each structure on the first substrate 1 is described in detail below.

As shown in FIG. 6, the first substrate 1 includes a first base plate 31, the thin film transistor (TFT) 40, the pixel electrodes 10 and the light-shielding electrodes 20 sequentially stacked, the thin film transistor 40 is electrically connected to the pixel electrode 10 for providing a driving voltage applied to the pixel electrode 10.

Optionally, the first base plate 31 may be a rigid base plate or a flexible base plate. The first base plate 31 is in the case of the rigid base plate, the rigid base plate such as a glass base plate may be included. The first base plate 31 is in the case of the flexible base plate, the flexible base plate such as polyimide (PI) films and ultra-thin glass films may be included.

Optionally, a buffer layer 32 is further provided between the first base plate 31 and the thin film transistor 40, and the buffer layer 32 may prevent unwanted impurities or pollutants (such as moisture, oxygen, etc.) from diffusing from the first base plate 31 into devices that may be damaged by the impurities or the contaminants, while also providing a planar top surface.

The thin film transistor 40 includes the active layer 41, a gate insulating layer 33, the gate 42, an interlayer insulating layer 34, the source 43 and the drain 44, and a passivation layer 35 and so on sequentially stacked on the buffer layer 32. The active layer 41 includes a channel region, a source region and a drain region located on both sides of the channel region, and the gate 42 corresponds to the channel region. The source 43 and the drain 44 are respectively electrically connected to the corresponding source region and the drain region through corresponding via holes of the interlayer insulating layer 34. The pixel electrode 10 is connected to the source 43 or the drain 44 through a via hole of the passivation layer 35, and the embodiment of the present disclosure is described by taking the pixel electrode 10 being connected to the drain 44 as an example. Certainly, the structure of the thin film transistor 40 of the present disclosure is not limited thereto, and the thin film transistor 40 of the present disclosure may also adopt a bottom-gate structure, a double-gate structure, and the like.

The gate scanning line SL is disposed on a same layer as the gate 42, and is configured to control the opening of the thin film transistor 40. The data line DL is disposed on a same layer as the source 43 or the drain 44, and is configured to provide a driving signal of the source 43 to the thin film transistor 40, so as to provide a driving voltage applied to the pixel electrode 10. The magnitude of the driving voltage applied to the pixel electrode 10 may control the deflection angle of the liquid crystal molecules 3, thereby controlling the brightness and darkness of the corresponding pixels on the display panel 100, and the gray scale represents levels in brightness from the darkest to the brightest, so the levels of the gray scale may be used to represent the brightness of a pixel to a certain extent, the brightness of the same pixel is brighter when it is displayed in a high gray scale than when it is displayed in a low gray scale, then correspondingly, a higher driving voltage needs to be provided to the pixel electrode 10 during high grayscale display. For example, taking an 8-bit display panel 100 as an example, the 8-bit display panel 100 may display 256 gray scale levels, and the 256 gray scale levels are divided into gray scale L0 to gray scale L255, the gray scale L255 represents the brightest brightness, and the gray scale L0 represents the darkest brightness.

The light-shielding electrodes 20 is disposed on a same layer as the pixel electrode 10, and the light-shielding electrode 20 is disposed opposite to the data line DL and the gate scanning line SL. In the embodiment, taking the light-shielding electrode 20 disposed opposite to the data line DL as an example, a width of the light-shielding electrode 20 is greater than a width of the corresponding data line DL, so that an orthographic projection of the data line DL on the first base plate 31 completely falls within an orthographic projection of the light-shielding electrode 20 on the first base plate 31, to avoid light leakage at the position corresponding to the data line DL.

Optionally, a material of the first common electrode 30 is the same as that of the pixel electrode 10. A constant voltage of low potential is applied to the first common electrode 30, and a voltage applied to the light-shielding electrode 20 may be equal to the voltage applied to the first common electrode 30, for example, the voltage applied to the light-shielding electrode 20 may be 0 V. When a driving voltage is applied to the pixel electrode 10, an electric field is formed between the pixel electrode 10 and the first common electrode 30 to deflect the liquid crystal molecules 3 in the corresponding pixel region PD, so as to allow backlight light to pass through. After that, the transmitted light passes through the color filter on the second substrate to emit light of a specific color. For example, the color filter includes a red color film, a green color film, and a blue color film, the light passes through the red color film to emit red light, the light passes through the green color film to emit green light, and the light passes through the blue color film to emit blue light. One pixel of the display panel 100 may include three sub-pixels, and the three sub-pixels respectively correspond to three different color films, so that the pixel may display different colors. In addition, by controlling the gray levels of the three sub-pixels, the pixels may present different colors, thereby realizing colorful display of the display panel 100.

Continuing to refer to FIG. 5, each pixel electrode 10 includes a first trunk electrode 11 extending along the first direction X, a second trunk electrode 12 extending along the second direction Y, and a plurality of branch electrodes 13. A first end 123 of the second trunk electrode 12 is electrically connected to the first trunk electrode 11, and the second trunk electrode 12 extends from the first end 123 to a direction away from the first trunk electrode 11, so as to divide the pixel electrode 10 into two quadrant regions. The plurality of the branch electrodes 13 are located in the corresponding quadrant regions, and each branch electrode 13 is electrically connected to the first trunk electrode 11 or the second trunk electrode 12. The branch electrodes 13 extend away from the first trunk electrode 11 or the second trunk electrode 12, and the branch electrodes 13 in two quadrants are disposed symmetrically about the second trunk electrode 12.

Referring to FIGS. 5 and 7, the display panel 100 further includes a plurality of auxiliary electrodes 60, the auxiliary electrodes 60 are disposed on the same layer as the pixel electrodes 10, and each auxiliary electrode 60 is located between adjacent one pixel electrode 10 and one light-shielding the electrode 20. The display panel 100 further includes a light emitting region TA and a non-light emitting region NTA surrounding the light emitting region TA, the pixel electrode 10 corresponds to the light emitting region TA, and the auxiliary electrode 60 and the light-shielding electrode 20 correspond to the non-light emitting region NTA. A voltage applied to the auxiliary electrode 60 is equal to a voltage applied to the pixel electrode 10. An extension direction of the auxiliary electrode 60 is the same as an extension direction of the first trunk electrode 11. An electric field is formed between the auxiliary electrodes 60 and the corresponding light-shielding electrode 20.

In the embodiment, by disposing the auxiliary electrode 60 close to the pixel electrode 10, a fringe electric field of the auxiliary electrode 60 makes the liquid crystal molecules 3 fall toward the auxiliary electrode 60, and the liquid crystal molecules 3 corresponding to the edge of the pixel electrode 10 are in the same deflection direction, so that the dark lines on the edge of the pixel electrode may be controlled above the auxiliary electrode, and the dark lines on the edge of the pixel electrode are capable to be avoided. Thereby, the problem of the serious dark lines close to the edge trunk of the existing pixel structure could be solved, which may improve the transmittance of the display panel.

Specifically, the auxiliary electrode 60 includes a first auxiliary electrode 61, the first auxiliary electrode 61 is located between the adjacent first trunk electrode 11 and the light-shielding electrode 20, there is a second gap 102 between the first auxiliary electrode 61 and the adjacent first trunk electrode 11, and there is a third gap 103 between the first auxiliary electrode 61 and the adjacent light-shielding electrode 20. The first auxiliary electrode 61 is electrically connected to the first trunk electrode 11. Optionally, the second trunk electrode 12 includes a first extension portion 121 extending from the first end 123 toward a direction close to the first auxiliary electrode 61, and the first auxiliary electrode 61 is electrically connected to the first trunk electrode 11 through the first extension portion 121.

Referring to FIGS. 5 and 7, by disposing the first auxiliary electrode 61 between the first trunk electrode 11 and the light-shielding electrode 20, a fringe electric field is generated by the first auxiliary electrode 61, and a horizontal electric field force makes sure that the liquid crystal molecules 3 fall toward the first auxiliary electrode 61. So that the liquid crystal molecules 3 corresponding to the first trunk electrode 11 may have the same deflection direction, and the dark lines may be generated at the position of the first auxiliary electrode 61, instead of the area of the pixel electrode 10 corresponding to the display area, thereby avoiding the dark lines in the edge area of the first trunk electrode 11 caused by inconsistent deflection direction of the liquid crystal molecules 3, and solving the problem of the serious dark lines close to the edge trunk of the existing pixel structures, which may improve the transmittance of the display panel.

Figure 8:
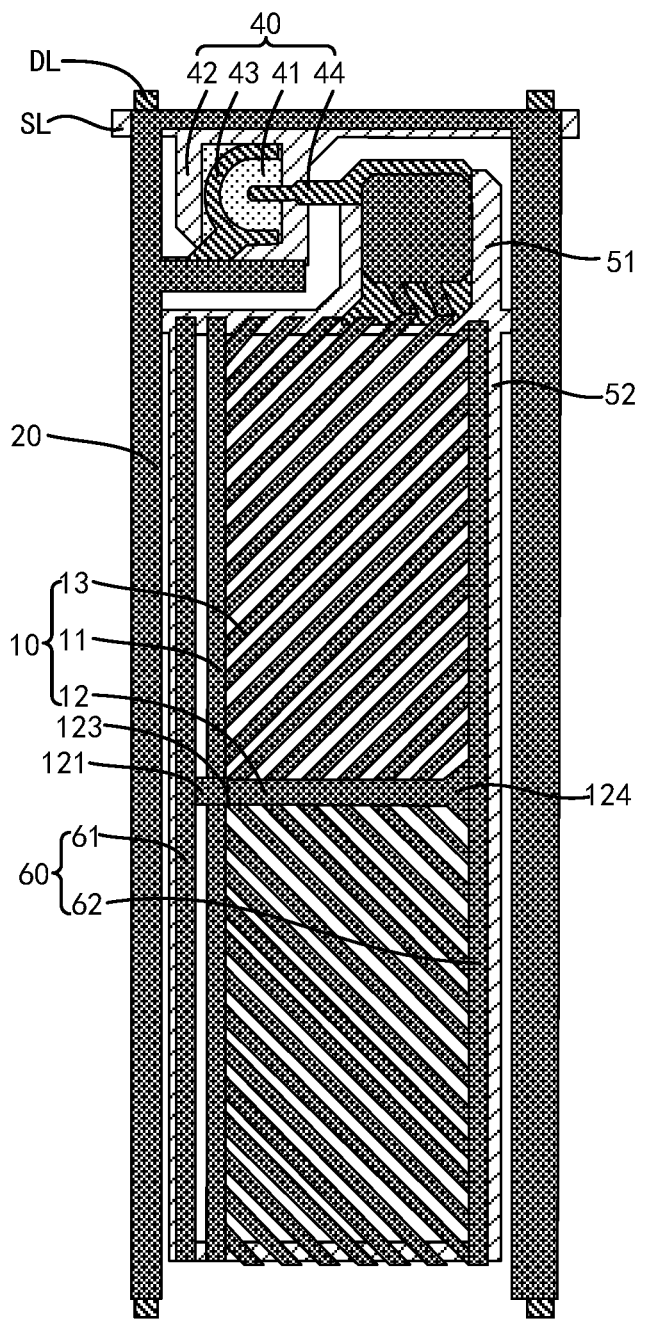
FIG. 8 is a second top schematic view of the pixel electrode provided by an embodiment of the present disclosure.
Figure 9:
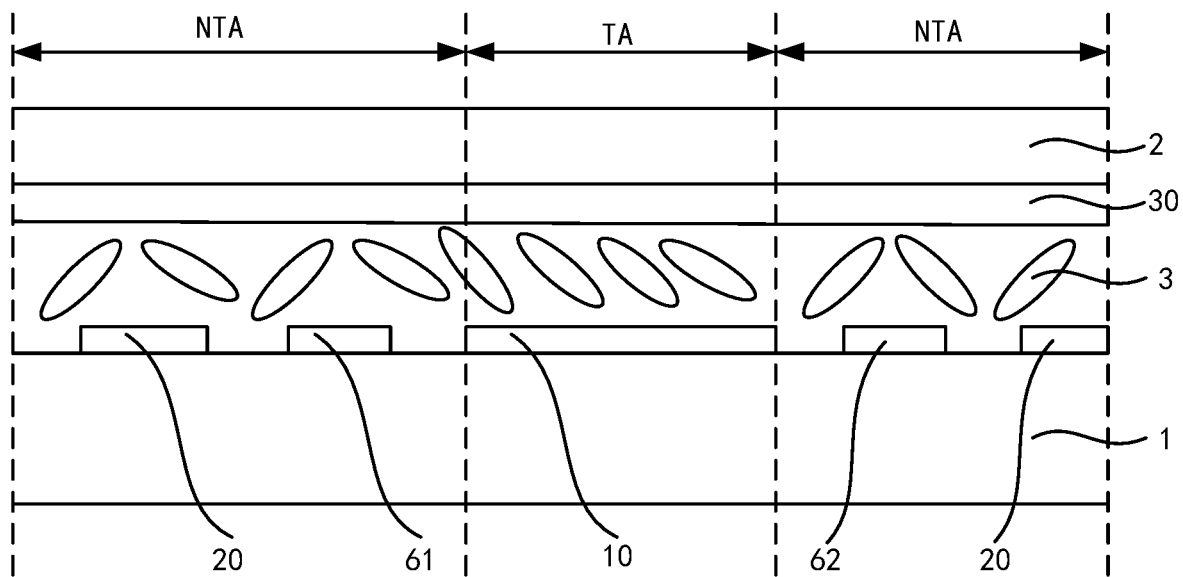
FIG. 9 is a schematic view of liquid crystal deflection at edges of the pixel electrode in FIG. 8.
Figure 10:
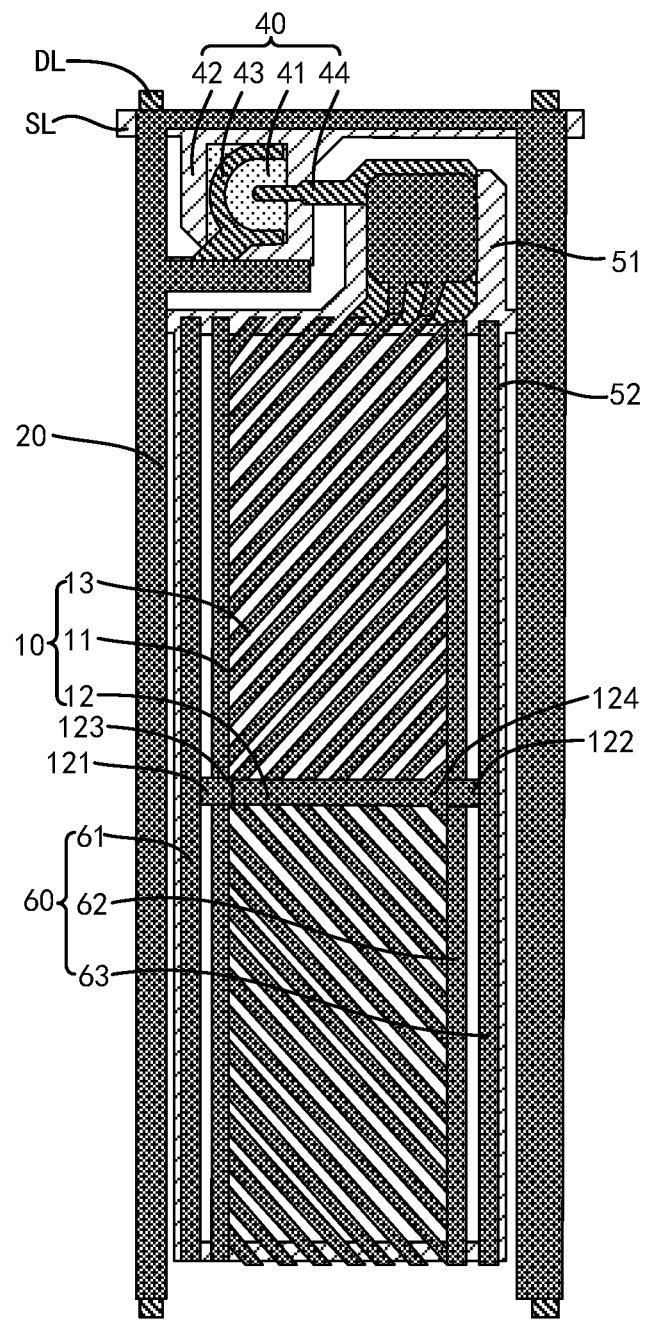
FIG. 10 is a third top schematic view of the pixel electrode provided by an embodiment of the present disclosure.

In one embodiment, referring to FIGS. 3 to 9, FIG. 8 is a second top schematic view of the pixel electrode provided by an embodiment of the present disclosure, and FIG. 9 is a schematic view of liquid crystal deflection at edges of the pixel electrode in FIG. 8. Different from the above embodiments, the auxiliary electrode 60 further includes a second auxiliary electrode 62, the second auxiliary electrode 62 is located on a side of the pixel electrode 10 away from the first auxiliary electrode 61. The second auxiliary electrode 62 is electrically connected to the second end 124 of the second trunk electrode 12 and an end of the branch electrode 13. As shown in FIG. 8, the second end 124 is opposite to the first end 123.

Referring to FIG. 9, in the embodiment, by adding the second auxiliary electrode 62 on other side of the pixel electrode 10, a fringe electric field and a horizontal electric field force are also generated by the second auxiliary electrode 62, and tilting angles of the liquid crystal molecules 3 on the branch electrodes 13 would be larger, thereby improving the liquid crystal efficiency and further improving the transmittance of the display panel 100. It can be understood that, the closer the liquid crystal molecules 3 on the branch electrodes 13 to the second auxiliary electrode 62 have a larger tilt angle, the higher efficiency the liquid crystal will have. For other descriptions, please refer to the above-mentioned embodiments, which is not repeated here.

In one embodiment, referring to FIGS. 3 to 10, FIG. 10 is a third top schematic view of the pixel electrode provided by an embodiment of the present disclosure. Different from the above embodiments, the auxiliary electrode 60 further includes a third auxiliary electrode 63, and the third auxiliary electrode 63 is located on a side of the second auxiliary electrode 62 away from the pixel electrode 10. The trunk electrode 12 further includes a second extension portion 122 extending from the second end 124 toward a direction close to the third auxiliary electrode 63, and the third auxiliary electrode 63 is electronically connected to the pixel electrodes 10 through the second extension portion 122. In the embodiment, by adding the third auxiliary electrode 63, a fringe electric field and a horizontal electric field force are also generated by the third auxiliary electrode 63, so that the liquid crystal molecules 3 on the branch electrodes 13 could fall down at a larger angle, to further improve the liquid crystal efficiency. In addition, the fringe electric field generated by the third auxiliary electrode 63 could improve the dark lines generated in the edge area of the pixel electrode 10. For other descriptions, please refer to the above-mentioned embodiments, which is not repeated here.

In one embodiment, referring to FIG. 3 to FIG. 11, and FIG. 11 is a fourth top schematic view of the pixel electrode provided by an embodiment of the present disclosure. Different from the above embodiments, the auxiliary electrode 60 further includes a second auxiliary electrode 62, and the second auxiliary electrode 62 is located on a side of the pixel electrode 10 away from the first auxiliary electrode 61. The trunk electrode 12 further includes a second extension portion 122 extending from the second end 124 toward a direction close to the second auxiliary electrode 62. The second auxiliary electrode 62 is electrically connected to the second auxiliary electrode 62 through the second extension portion 122. In the embodiment, by adding the second auxiliary electrode 62, a fringe electric field and a horizontal electric field force are also generated by the second auxiliary electrode 62, so that the liquid crystal molecules 3 on the branch electrodes 13 could fall down at a larger angle, thereby improving the liquid crystal efficiency. In addition, the fringe electric field generated by the second auxiliary electrode 62 may also improve the dark fringe generated in the edge area of the pixel electrode 10. For other descriptions, please refer to the above-mentioned embodiments, which is not repeated here.

Figure 11:
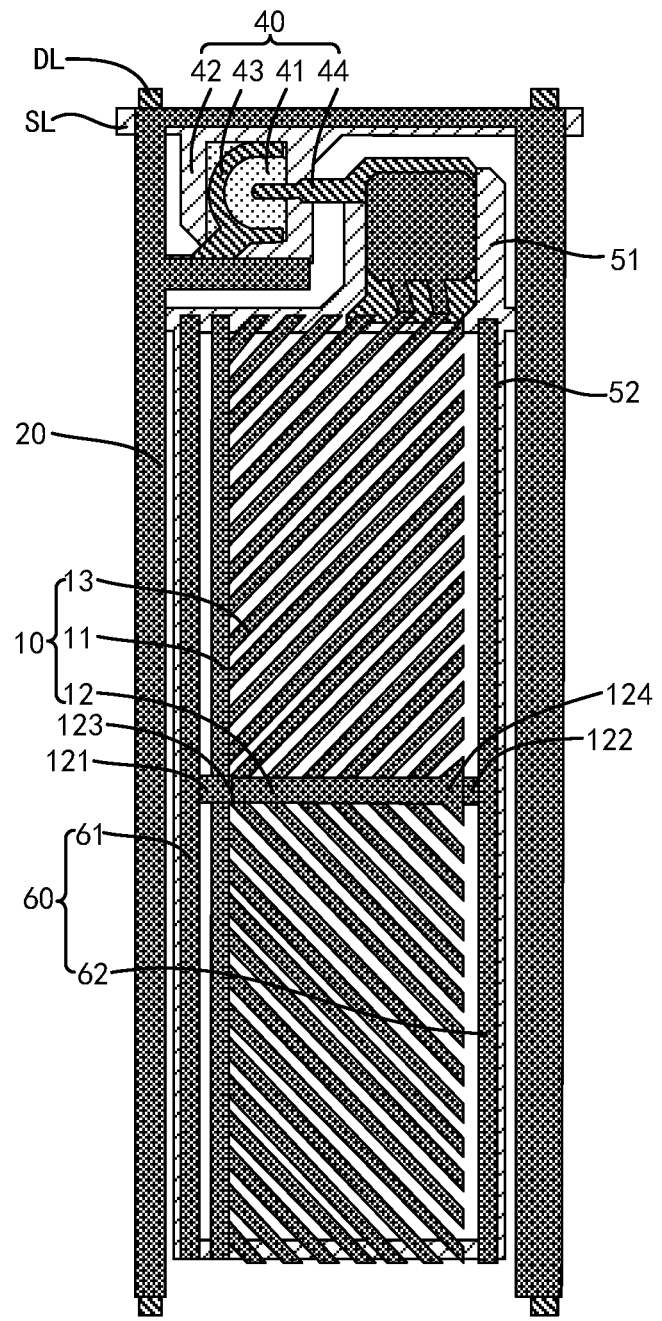
FIG. 11 is a fourth top schematic view of the pixel electrode provided by an embodiment of the present disclosure.

Referring to FIG. 11, in some embodiments, the second auxiliary electrode 62 is spaced from the end of the branch electrode 13 of the pixel electrode 10.

In one embodiment, referring to FIGS. 3 to 12, and FIG. 12 is a fifth top schematic view of the pixel electrode provided by an embodiment of the present disclosure. Different from the above embodiments, the auxiliary electrode 60 includes a first auxiliary electrode 61 and a second auxiliary electrode 62, the first auxiliary electrode 61 is located on a side of the pixel electrode 10 away from the first trunk electrode 11, the first auxiliary electrode 61 is electrically connected to the second end 124 of the second trunk electrode 12 and the end of the branch electrode 13, and the second end 124 is opposite to the first end 123. The second auxiliary electrode 62 is located on a side of the first auxiliary electrode 61 away from the pixel electrode 10. The second trunk electrode 12 further includes a second extension portion 122 extending from the second end 124 toward a direction close to the second auxiliary electrode 62. The second auxiliary electrode 62 is electrically connected to the pixel electrode 10 through the second extension portion 122. In the embodiment, by disposing the first auxiliary electrode 61 and the second auxiliary electrode 62, a fringe electric field and a horizontal electric field force are also generated by both the first auxiliary electrode 61 and the second auxiliary electrode 62, so that the liquid crystal molecules 3 on the branch electrodes 13 could fall down at a larger angle, to further improve the liquid crystal efficiency. In addition, the fringe electric field generated by the second auxiliary electrode 62 could improve the dark lines generated in the edge area of the pixel electrode 10. For other descriptions, please refer to the above-mentioned embodiments, which is not repeated here.

Figure 12:
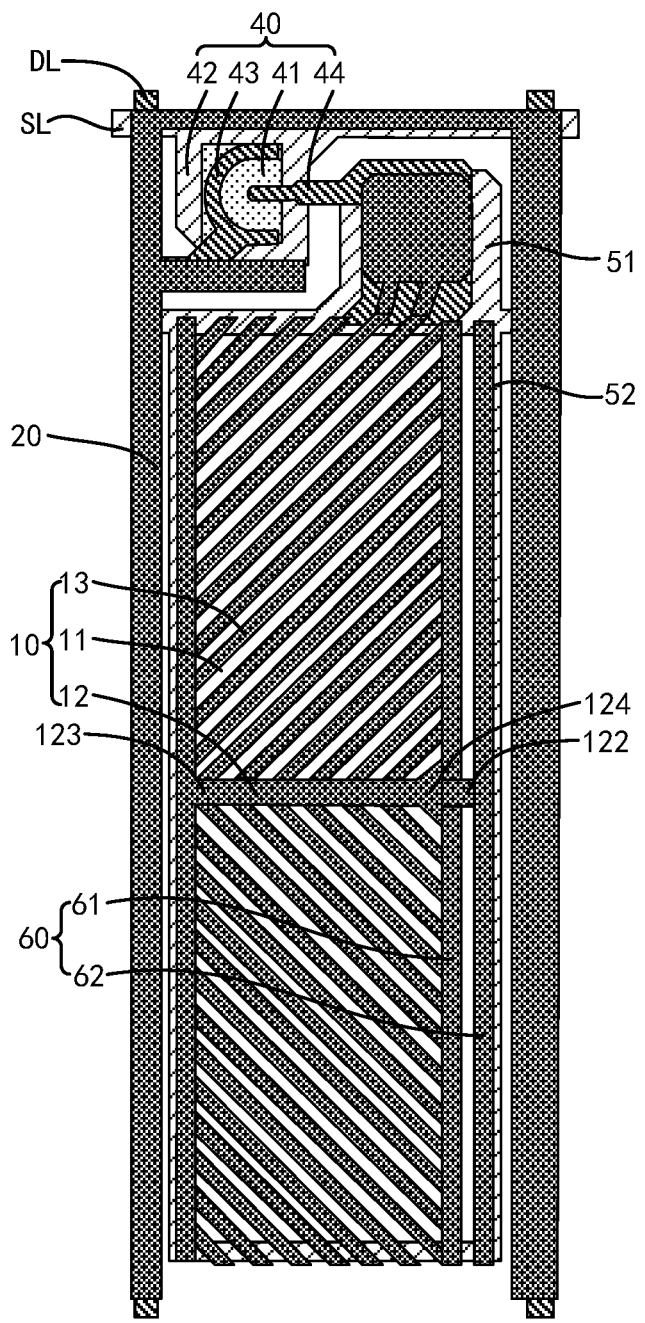
FIG. 12 is a fifth top schematic view of the pixel electrode provided by an embodiment of the present disclosure.

Referring to FIG. 12, specifically, the second auxiliary electrode 62 is spaced apart from the first auxiliary electrode 61.

Based on the same inventive concept, an embodiment of the present disclosure further provides a display device, which includes the display panel 100 of one of the foregoing embodiments, a backlight module opposite to the display panel 100, and a cover plate on the display panel 100 and the like. The cover plate is used to protect the display panel 100, and the backlight module is used to provide backlight source for the display panel 100. The display device includes mobile phones, televisions, notebook computers, wearable display devices, and the like.

According to the above-mentioned embodiments, the display panel and the display device provided by the present disclosure include the first substrate, the second substrate opposite to the first substrate, and the liquid crystal molecules disposed between the first substrate and the second substrate. The display panel further includes the plurality of the pixel electrodes, the plurality of the light-shielding electrodes, and the plurality of the auxiliary electrodes. The light-shielding electrodes are disposed on a same layer as the pixel electrodes, and the light-shielding electrode is correspondingly disposed in a first gap. The auxiliary electrodes are disposed on the same layer as the pixel electrodes, the auxiliary electrode is located between the adjacent pixel electrode and the light-shielding electrode, and the voltage applied to the auxiliary electrode is equal to the voltage applied to the corresponding pixel electrode. An electric field is formed between the auxiliary electrode and the corresponding light-shielding electrode, so that the deflection directions of the liquid crystal molecules corresponding to the edge of the pixel electrode are consistent, avoiding the dark lines generated on the edge of the pixel electrode, thereby solving the problem of the serious dark lines close to the edge trunk of the existing pixel structures.

In the foregoing embodiments, the description of each of the embodiments has respective focuses. For a part that is not described in detail in an embodiment, reference may be made to relevant descriptions in other embodiments.

The present disclosure is described in detail above. The principle and implementations of the present disclosure are described in this specification by using specific examples. The description about the foregoing embodiments is merely provided to help understand the method and core ideas of the present disclosure. Persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A display panel, comprising:
   a first substrate and a second substrate disposed oppositely;
   a plurality of liquid crystal molecules disposed between the first substrate and the second substrate;
   a plurality of pixel electrodes disposed on one side of the first substrate facing the second substrate in an array, wherein a first gap is defined between adjacent ones of the pixel electrodes;
   a plurality of light-shielding electrodes disposed on a same layer as the pixel electrodes, each of the light-shielding electrodes correspondingly disposed in the first gap; and
   a plurality of auxiliary electrodes disposed on the same layer as the pixel electrodes, each of the auxiliary electrodes being located between adjacent one of the pixel electrodes and one of the light-shielding electrodes, a voltage applied to each of the auxiliary electrodes being equal to a voltage applied to corresponding one of the pixel electrodes;
   wherein an electric field is formed between each of the auxiliary electrodes and corresponding one of the light-shielding electrodes;
   each of the pixel electrodes comprises a first trunk electrode extending in a first direction, a second trunk electrode extending in a second direction, and a plurality of branch electrodes, a first end of the second trunk electrode is directly connected to the first trunk electrode, the second trunk electrode extends from the first end towards a direction away from the first trunk electrode, the pixel electrode is divided into two quadrant regions by the first trunk electrode and the second trunk electrode together, the branch electrodes are located in the quadrant regions, and each of the branch electrodes is electrically connected to the first trunk electrode or the second trunk electrode; and
   an extension direction of each of the auxiliary electrodes is the same as an extension of corresponding first trunk electrode, each of the auxiliary electrodes is located on one side of the corresponding first trunk electrode, and the two quadrant regions and the branch electrodes are both located on opposite side of the corresponding first trunk electrode.

2. The display panel of claim 1, wherein each of the auxiliary electrodes comprises a first auxiliary electrode located between the first trunk electrode and adjacent one of the light-shielding electrodes, and is electrically connected to the first trunk electrode.

3. The display panel of claim 2, wherein a second gap is defined between the first auxiliary electrode and an adjacent first trunk electrode, and a third gap is defined between the first auxiliary electrode and adjacent one of the light-shielding electrodes.

4. The display panel of claim 2, wherein the second trunk electrode comprises a first extension portion extending from the first end towards a direction close to the first auxiliary electrode, and the first auxiliary electrode is electrically connected to the first trunk electrode through the first extension portion.

5. The display panel of claim 2, wherein each of the auxiliary electrodes further comprises a second auxiliary electrode located on a side of corresponding one of the pixel electrodes away from the first auxiliary electrode, the second auxiliary electrode is electrically connected to a second end of the second trunk electrode and ends of the branch electrodes, and the second end is opposite to the first end.

6. The display panel of claim 5, wherein each of the auxiliary electrodes further comprises a third auxiliary electrode located on a side of the second auxiliary electrode away from the corresponding one of the pixel electrodes, the second trunk electrode further comprises a second extension portion extending from the second end towards a direction close to the third auxiliary electrode, and the third auxiliary electrode is electrically connected to the corresponding one of the pixel electrodes through the second extension portion.

7. The display panel of claim 5, wherein the second auxiliary electrode is spaced apart from the first auxiliary electrode.

8. The display panel of claim 2, wherein each of the auxiliary electrode further comprises a second auxiliary electrode located on a side of corresponding one of the pixel electrodes away from the first auxiliary electrode, the second trunk electrode further comprises a second extension portion extending from the second end towards a direction close to the second auxiliary electrode, and the second auxiliary electrode is electrically connected to the corresponding one of the pixel electrodes through the second extension portion.

9. The display panel of claim 8, wherein the second auxiliary electrode is spaced apart from ends of the branch electrodes of the corresponding one of the pixel electrodes.

10. The display panel of claim 1, wherein each of the auxiliary electrodes comprises a first auxiliary electrode locate on a side of corresponding one of the pixel electrodes away from the first trunk electrode, the first auxiliary electrode is electrically connected to a second end of the second trunk electrode and ends of the branch electrodes, and the second end is opposite to the first end.

11. The display panel of claim 10, wherein each of the auxiliary electrodes further comprises a second auxiliary electrode located on a side of the first auxiliary electrode away from the corresponding one of the pixel electrodes, the second trunk electrode further comprises a second extension portion extending from the second end towards a direction close to the second auxiliary electrode, and the second auxiliary electrode is electrically connected to the corresponding one of the pixel electrodes through the second extension portion.

12. The display panel of claim 1, wherein a plurality of branch electrodes in one of the two quadrant regions and a plurality of branch electrodes in another one of the two quadrant regions are disposed symmetrically about the second trunk electrode.

13. The display panel of claim 1, wherein the display panel further comprises a plurality of data lines disposed in parallel intervals along a first direction and a plurality of gate scanning lines disposed in parallel intervals along a second direction, the data lines and the gate scanning lines intersect to define a plurality of pixel regions, the pixel electrodes are respectively disposed in different pixel regions, the light-shielding electrodes correspond to the data lines and the gate scanning lines, and a width of each of the light-shielding electrodes is greater than a width of corresponding one of the data lines and a width of corresponding one of the gate scanning lines.

14. The display panel of claim 1, wherein the display panel further comprises a plurality of light-emitting regions and a plurality of non-light-emitting regions surrounding the light-emitting regions, the pixel electrodes correspond to the light-emitting regions, and the light-shielding electrodes and the auxiliary electrode are both located in the non-light emitting regions.

15. The display panel of claim 1, wherein a first common electrode is disposed on a side of the second substrate facing the first substrate, and voltages applied to the light-shielding electrodes are equal to a voltage applied to the first common electrode.

16. A display device, comprising:
a display panel;
a backlight module opposite to the display panel; and
a cover plate covering the display panel;
wherein the display panel comprises:
a first substrate and a second substrate disposed oppositely;
liquid crystal molecules disposed between the first substrate and the second substrate;
a plurality of pixel electrodes disposed on one side of the first substrate facing the second substrate in an array, wherein a first gap is defined between adjacent ones of the pixel electrodes;

a plurality of light-shielding electrodes disposed on a same layer as the pixel electrodes, each of the light-shielding electrodes correspondingly disposed in the first gap; and a plurality of auxiliary electrodes disposed on the same layer as the pixel electrodes, each of the auxiliary electrodes being located between adjacent one of the pixel electrodes and one of the light-shielding electrodes, a voltage applied to each of the auxiliary electrodes being equal to a voltage applied to corresponding one of the pixel electrodes;

wherein an electric field is formed between each of the auxiliary electrodes and corresponding one of the light-shielding electrodes;

each of the pixel electrodes comprises a first trunk electrode extending in a first direction, a second trunk electrode extending in a second direction, and a plurality of branch electrodes, a first end of the second trunk electrode is directly connected to the first trunk electrode, the second trunk electrode extends from the first end towards a direction away from the first trunk electrode, the pixel electrode is divided into two quadrant regions by the first trunk electrode and the second trunk electrode together, the branch electrodes are located in the quadrant regions, and each of the branch electrodes is electrically connected to the first trunk electrode or the second trunk electrode; and an extension direction of each of the auxiliary electrodes is the same as an extension of corresponding first trunk electrode, each of the auxiliary electrodes is located on one side of the corresponding first trunk electrode, and the two quadrant regions and the branch electrodes are both located on opposite side of the corresponding first trunk electrode.

17. The display device of claim 16, wherein each of the auxiliary electrodes comprises a first auxiliary electrode located between the first trunk electrode and adjacent one of the light-shielding electrodes, and is electrically connected to the first trunk electrode.

18. The display device of claim 17, wherein the second trunk electrode comprises a first extension portion extending from the first end towards a direction close to the first auxiliary electrode, and the first auxiliary electrode is electrically connected to the first trunk electrode through the first extension portion.

* * * * *